Patented Aug. 20, 1940

2,212,187

UNITED STATES PATENT OFFICE 2,212,187

2-METHYL-4,6-DIOXO-5-IODO-TETRAHYDROPYRIDINE-1-ACETIC ACID AND PROCESS FOR THE MANUFACTURE THEREOF

Otto Schnider, Basel, Switzerland, assignor to Hoffmann-La Roche Inc., Nutley, N. J., a corporation of New Jersey No Drawing. Application October 23, 1939, Serial No. 300,848. In Switzerland July 18, 1939

12 Claims. (Cl. 260—295)

2-methyl-4,6-dioxo-5-iodo-tetrahydropyridine-1-acetic acid of the formula

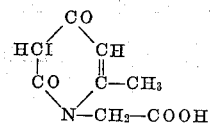

has not hitherto been known. It has been found that this compound can be obtained by converting 2-methyl-4,6-dioxo-pyridine (Knoevenagel and Fries, "Berichte der Deutschen Chemischen Gesellschaft," vol. 31, year 1898, page 767), into the N-acetic acid derivative and iodinating the same.

2-methyl-4,6-dioxo-5-iodo-tetrahydropyridine-1-acetic acid is a colourless compound which is difficultly soluble in water and the usual organic solvents. It melts at 226° C. with decomposition. Its salts with alkalies and organic bases are easily soluble in water. They are harmless to the human or animal organism and excellently suited for making internal organs visible in Röntgen rays.

Example 1

183 parts by weight of 2-methyl-4,6-dioxo-tetrahydropyridine-1-acetic acid (obtained from 2-methyl-4,6-dioxypyridine with chloroacetic acid in alkaline solution; decomposition point 270° C.) are dissolved in 1850 parts by weight of 3 n hydrochloric acid while heating and stirring. Into the solution cooled to about 20° C. while stirring continuously, a solution of 162.4 parts by weight of iodine-mono-chloride in 80 parts by weight of acetic acid are added drop by drop in the course of three quarters of an hour. The iodination proceeds with gentle evolution of heat. After completion of the addition, the product is stirred for another 2 hours at room temperature and the precipitated 2-methyl-4,6-dioxo-5-iodo-tetrahydropyridine-1-acetic acid obtained by sucking off and washing with water. After drying it shows a decomposition of 222° C. (with frothing and evolution of violet vapour). The acid can be further purified by way of its sodium salt which is easily soluble in water, difficultly soluble in alcohol and acetone. Thereby, the decomposition point rises to 226° C. Iodine content: calculated 41.10%, found 41.56%.

The sodium salt is a colourless compound which crystallises with water of crystallisation and decomposes and becomes brown above 230° C.

Example 2

183 parts by weight of 2-methyl-4,6-dioxo-tetrahydropyridine-1-acetic acid are dissolved in 1700 parts by weight of water containing 120 parts by weight of caustic soda, while stirring. While cooling with ice, a solution of 254 parts by weight of iodine in 200 parts by weight of water and 200 parts by weight of potassium iodide is added dropwise within a period of about 60 minutes. When all has been added, the product is stirred for a further period of 24 hours at room temperature. By acidification, filtering by suction, and purification by way of the sodium salt, 2-methyl-4,6-dioxo-5-iodo-tetrahydropyridine-1-acetic acid is obtained with the properties described in Example 1.

Example 3

183 parts by weight of 2-methyl-4,6-dioxo-tetrahydropyridine-1-acetic acid are dissolved in 2000 parts by weight of approximately 25% of aqueous ammonia while stirring. While cooling with ice, a solution of 254 parts by weight of iodine in 200 parts by weight of water and 200 parts by weight of potassium iodide is added dropwise to the reaction solution from which part of the acid has separated in the form of its ammonium salt. The iodine colour disappears immediately.

In course of time, the ammonium salt of 2-methyl-4,6-dioxo-5-iodo-tetrahydropyridine-1-acetic acid begins to precipitate. After completion of the addition, the precipitation is completed by the introduction of 1000 parts by weight of ethanol. From the ammonium salt, obtained by suction, the free 2-methyl-4,6-dioxo-5-iodo-tetrahydropyridine-1-acetic acid can be isolated by acidification of its solution with dilute formic acid. It has the properties described in Example 1.

From the free acid, for instance, the diethanolamine salt is obtained by introducing the acid into the calculated quantity of an aqueous solution of diethanolamine. The colourless salt, which is very easily soluble in water, can be precipitated from the aqueous solution with acetone. It melts at 190–191° C. with decomposition.

I claim:

1. A compound selected from the group consisting of 2-methyl-4, 6-dioxo-5-iodo-tetrahydropyridine-1-acetic acid and its salts.

2. 2-methyl-4, 6-dioxo-5-iodo-tetrahydropyridine-1-acetic acid.

3. Salts of 2-methyl-4, 6-dioxo-5-iodo-tetrahydropyridine-1-acetic acid.

4. 2-methyl-4, 6-dioxo-5-iodo-tetrahydropyridine-1-acetic acid sodium salt.

5. 2-methyl-4, 6-dioxo-5-iodo-tetrahydropyridine-1-acetic acid diethanolamine salt.

6. In a process for the manufacture of 2-methyl-4, 6-dioxo-5-iodo-tetrahydropyridine-1-acetic acid and its salts, the steps comprising reacting 2-methyl-4, 6-dioxo-tetrahydropyridine with halogen-acetic acid and then iodinating the tetrahydropyridine ring in position 5.

7. Process for the manufacture of 2-methyl-4, 6-dioxo-5-iodo-tetrahydropyridine-1-acetic acid, comprising transforming 2-methyl-4, 6-dioxo-tetrahydropyridine into 2-methyl-4, 6-dioxo-tetrahydropyridine acetic acid and iodinating the same.

8. Process for the manufacture af 2-methyl-4, 6-dioxo-5-iodo-tetrahydropyridine-1-acetic acid, comprising reacting 2-methyl-4, 6-dioxo-tetrahydropyridine wth halogen-acetic acid and treating the reaction product formed with an iodinating agent.

9. Process for the manufacture of salts of 2-methyl-4, 6-dioxo-5-iodo-tetrahydropyridine-1-acetic acid, comprising transforming 2-methyl-4, 6-dioxo-tetrahydropyridine into 2-methyl-4, 6-dioxo-tetrahydropyridine acetic acid, iodinating the same, and transforming the reaction product formed into its salt.

10. Process for the manufacture of salts of 2-methyl-4, 6-dioxo-5-iodo-tetrahydropyridine-1-acetic acid, comprising transforming 2-methyl-4, 6-dioxo-tetrahydropyridine into 2-methyl-4, 6-dioxo-tetrahydropyridine acetic acid, transforming the reaction product formed into its salt, and iodinating the same.

11. Process for the manufacture of 2-methyl-4, 6-dioxo-5-iodo-tetrahydropyridine-1-acetic acid sodium salt, comprising transforming 2-methyl-4, 6-dioxo-tetrahydropyridine into 2-methyl-4, 6-dioxo-tetrahydropyridine acetic acid, transforming the reaction product formed into its sodium salt, and iodinating the same.

12. Process for the manufacture of 2-methyl-4, 6 - dioxo - 5 - iodo-tetrahydropyridine - 1 - acetic diethanolamine salt, comprising transforming 2-methyl-4, 6-dioxo-tetra-hydropyridine into 2-methyl-4, 6-dioxo-tetrahydropyridine acetic acid, iodinating the same, and transforming the reaction product formed into its diethanolamine salt.

OTTO SCHNIDER.